(No Model.)
I. M. THOMPSON.
GATE.
No. 412,998. Patented Oct. 15, 1889.
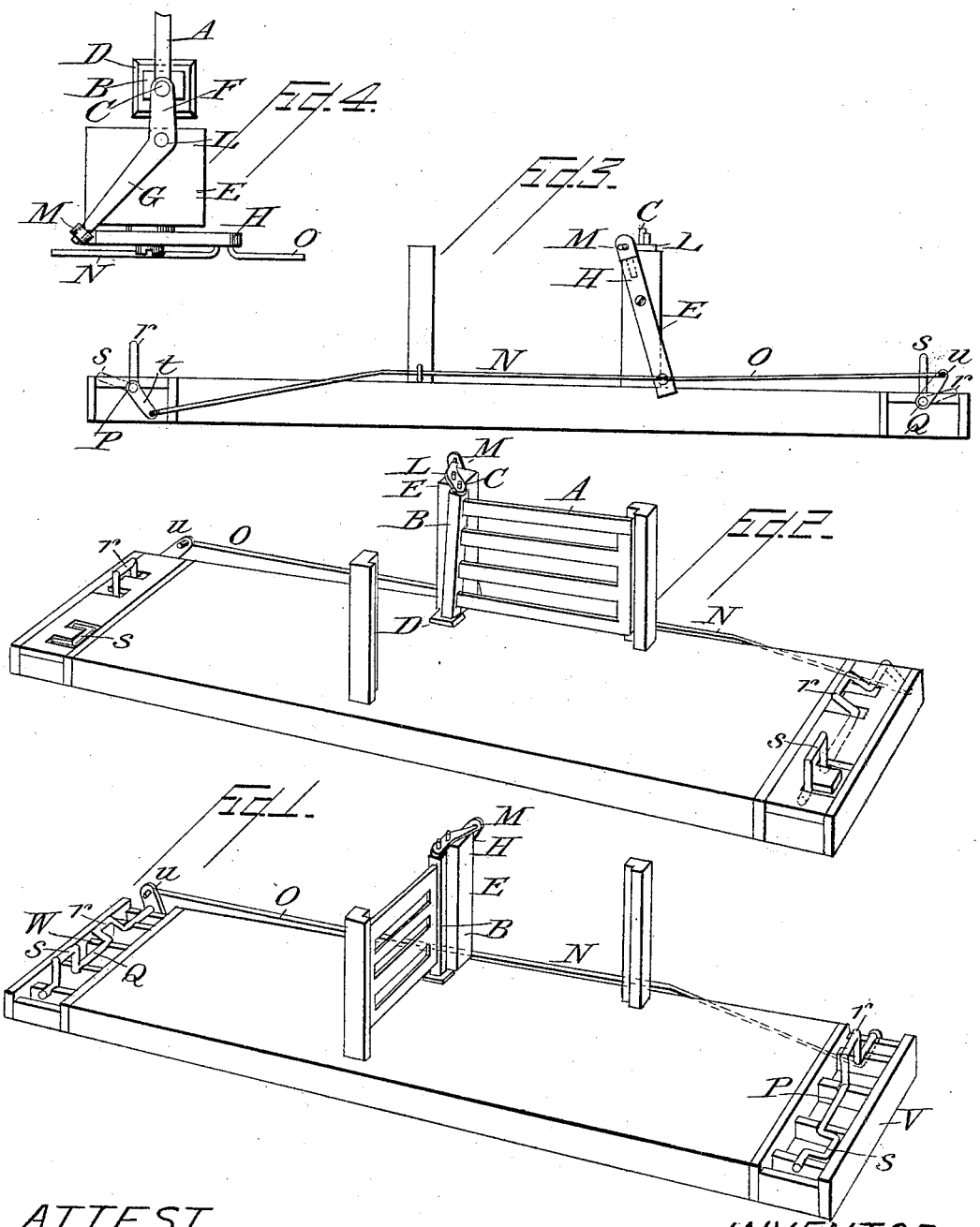
ATTEST.
F. H. Schott
J. E. Tasker.
INVENTOR.
Isaac M. Thompson
By H. P. Hood
Atty.

UNITED STATES PATENT OFFICE.

ISAAC M. THOMPSON, OF FRANKLIN, INDIANA.

GATE.

SPECIFICATION forming part of Letters Patent No. 412,998, dated October 15, 1889.

Application filed July 15, 1889. Serial No. 317,631. (No model.)

*To all whom it may concern:*

Be it known that I, ISAAC M. THOMPSON, a citizen of the United States, residing at Franklin, in the county of Johnson and State of Indiana, have invented a new and useful Improvement in Automatic Gates, of which the following is a specification.

My invention relates to an improvement in that class of gates which are automatically opened and closed by the passage of a vehicle over double-cranked shafts arranged to operate a tilting mechanism, whereby the gate is caused to swing in opposite directions by the force of gravitation.

The object of my improvement is to provide a simple and durable tilting mechanism, as hereinafter fully described.

The accompanying drawings illustrate my invention.

Figure 1 is a view in perspective showing the gate closed. Fig. 2 is a similar view showing the gate open. Fig. 3 is an end elevation. Fig. 4 is a partial plan showing the tilting lever on a larger scale.

The gate A is rigidly secured at one edge to a vertical bar B, which is provided with a cylindrical journal or pivot, as C, at each end. The lower pivot of the bar B rests in a bearing D, set in the ground near the fixed gate-post E. A lever L, bent to form a short arm F, and a long arm G, arranged to form an obtuse angle, is pivoted at its angle to the top and inner edge of the post E, so as to swing in a horizontal plane, the arrangement being such that the short arm projects over the inner edge of the post and forms a shifting bearing for the upper pivot C of bar B, while the longer end of the lever projects over the outer edge of the post. Pivoted to the outer face of post E is a lever H, which extends nearly the whole length of the post. The upper end of lever H is connected with the bent lever L by a swivel-coupling M, and its lower end is connected by rods N and O with a pair of double-cranked shafts P and Q, arranged across the roadway at some distance from the gate on each side. Shafts P and Q are each provided with a pair of cranks *r* and *s*, arranged substantially at right angles to each other and far enough apart to permit a carriage of ordinary width to pass between them. Shaft P is also provided with an arm *t*, and shaft Q with an arm *u*, and the respective shafts are mounted in bearings formed in narrow frames V and W, which are sunken across the roadway on opposite sides of the gate, so that their tops are flush with the surface, and the cranks may alternately project above the surface on opposite sides of the road when the shafts are turned. In Fig. 1 the covers of these frames have been removed, while in Fig. 2 they are shown in place.

Rods N and O connect arms *t* and *u* with the lever H, and the arrangement of the shafts and their respective cranks and arms is such that when either crank of one shaft is turned down the corresponding crank of the other shaft is raised and lever H is swung on its pivot.

The operation of my device is as follows: The gate being closed, as in Fig. 1, and crank *r* of shaft P being in an erect position, crank *r* of shaft Q is depressed and crank *s* of the same shaft is erect, and levers H and L are in the position shown in Figs. 3 and 4. The gate may now be opened from either side by passing the wheel of an approaching vehicle over, and thus depressing either crank *r* of shaft P or crank *s* of shaft Q. It will be observed that the cranks which are erect when the gate is closed are on opposite sides of the roadway, and are therefore either of them at the right side of a vehicle approaching the gate. When crank *r* of shaft P is turned down, levers H and L are turned on their pivots through their connection with each other and with arm *t* through rod N, and the upper bearing of bar B is thrown outward and forward, thus raising the free end of the gate, so as to unlatch it, and causing it to swing open by the force of gravitation. At the same time shaft Q is turned through its connection, by its arm *u* and rod O, with lever H, and its crank *r* is raised into the path of the approaching vehicle-wheel to be again depressed as the wheel passes over it, thus restoring the parts to their normal position and closing the gate. If the vehicle approaches from the opposite side, crank *s* of shaft Q is first engaged and the same result follows.

I claim as my invention—

The combination of the gate having an upper and a lower vertical pivot at one of its edges, the fixed bearing for the lower pivot, the gate-post, the bent lever pivoted to the post so as to swing horizontally across its top, and forming at one end a shifting bearing for the upper pivot of the gate, the lever pivoted to the outer edge of the post so as to swing in a vertical plane thereon, and having at its upper end the swivel-coupling M, and the pair of double-cranked shafts mounted in bearings on opposite sides of the gateway, and each having an arm which is connected with the lower end of the vertical lever by a connecting-rod, all being arranged to co-operate substantially as and for the purpose specified.

ISAAC M. THOMPSON.

Witnesses:
JAS. R. SHARP,
CHAS. A. COMMISKEY.